United States Patent [19]

Varsik

[11] Patent Number: 5,411,370
[45] Date of Patent: May 2, 1995

[54] VIBRATION DAMPING SHROUD FOR A TURBOMACHINE VANE

[75] Inventor: David A. Varsik, Manchester, Conn.

[73] Assignee: United Technologies Corporation, Hartford, Conn.

[21] Appl. No.: 283,883

[22] Filed: Aug. 1, 1994

[51] Int. Cl.$^6$ .......................... F01D 25/04; F01D 9/02
[52] U.S. Cl. .................................. 415/209.4; 415/119
[58] Field of Search ............... 415/209.3, 209.4, 210.1, 415/119

[56] References Cited

U.S. PATENT DOCUMENTS

| | | | |
|---|---|---|---|
| 3,778,184 | 12/1973 | Wood | 415/209.4 |
| 3,932,056 | 1/1976 | Tai | 415/209.4 |
| 4,305,696 | 12/1981 | Pask | 415/209.4 |
| 4,655,682 | 4/1987 | Kunz et al. | 415/119 |
| 5,074,752 | 12/1991 | Murphy et al. | 415/209.4 |
| 5,328,327 | 7/1994 | Naudet | 415/209.4 |
| 5,346,362 | 9/1994 | Bonner et al. | 415/209.1 |

*Primary Examiner*—Edward K. Look
*Assistant Examiner*—Michael S. Lee
*Attorney, Agent, or Firm*—Kenneth C. Baran

[57] ABSTRACT

A gas turbine engine (10) has a row of fan stator vanes (18) extending radially across a flow path (20) and joined to inner and outer cases (22) and (24). A vibration damping shroud (78) includes a radially extending chamber (84) for receiving one end of each stator vane in a primary vibration damping material (86). At least one pin receiving cavity (88), independent of the chamber, contains a secondary vibration damping material (92) which slidably engages a corresponding support pin (72) extending from the adjacent case (22) to anchor the vane to the case. The independence of the chamber and the cavity enables the use of different primary and secondary materials capable of satisfying conflicting performance requirements.

6 Claims, 4 Drawing Sheets

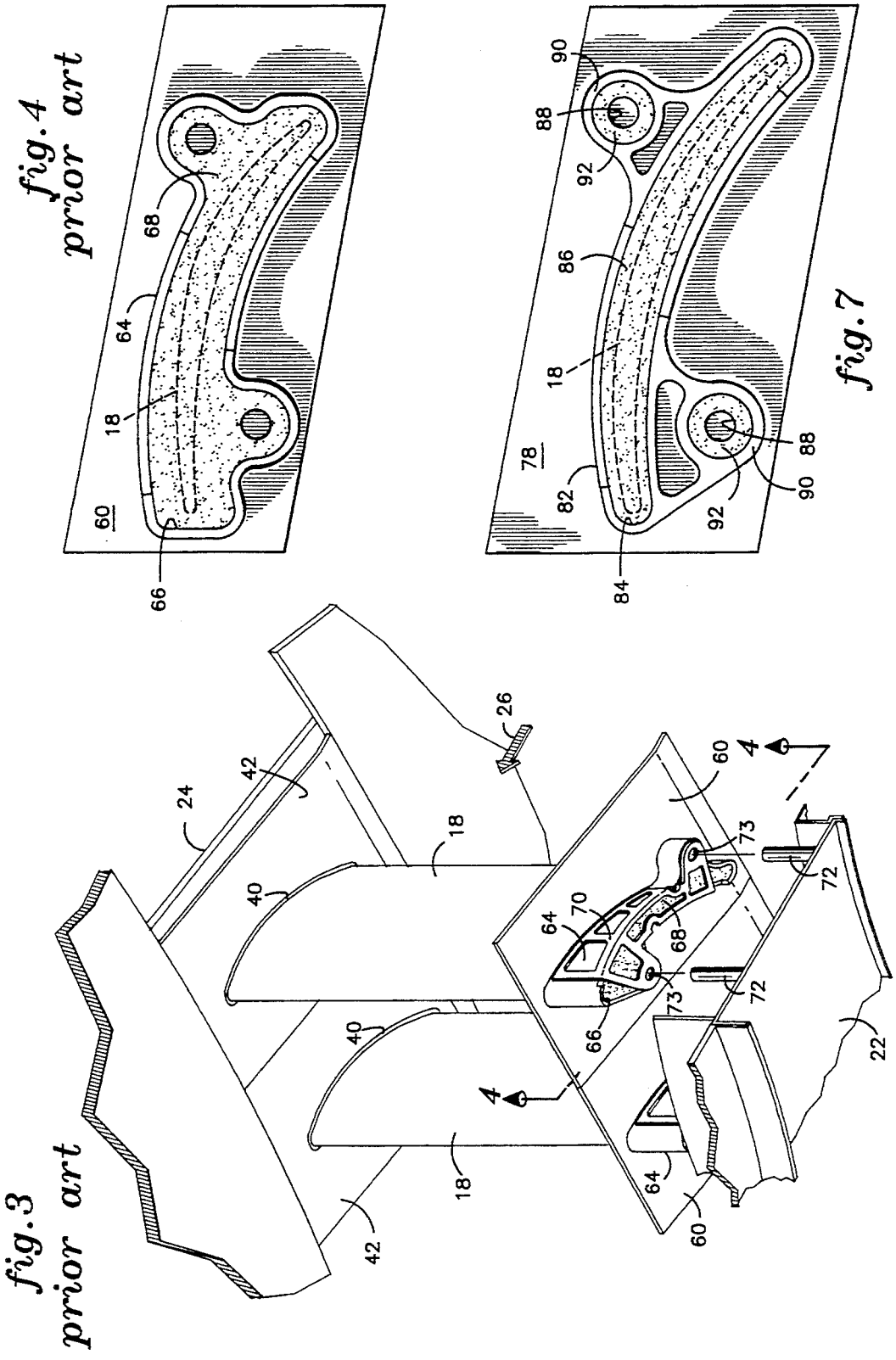

VIBRATION DAMPING SHROUD FOR A TURBOMACHINE VANE

TECHNICAL FIELD

This invention relates to stator vanes for a gas turbine engine and more particularly to an improved vibration damping shroud for bounding the flow path through the engine at one end of the vanes and for attaching the vanes to a case.

BACKGROUND OF THE INVENTION

Gas turbine engines employ fans and compressors with longitudinally alternating rows of rotating blades and nonrotating vanes to compress an incoming air stream and direct that air stream essentially longitudinally. The blades and vanes are airfoils which are disposed radially across an annular flow path between concentric inner and outer cases. The vanes are joined to both the inner and outer cases and have a natural vibratory frequency which is higher than the excitory frequencies to which the vanes are exposed during normal engine operation.

During engine operation, it is normal for different parts of the engine to be at different temperatures. For example, the inner case may be at a temperature different from that of the vanes and the outer case. Moreover, the inner case temperature can vary independently of the temperature of the vanes and the outer case. Consequently, the inner case expands or contracts in the radial direction relative to the vanes and outer case. To accommodate this differential thermal response, the inner end of each vanes is anchored to the inner case so that longitudinal and circumferential displacement of the vane is resisted by the case, but radial expansion and contraction of the case relative to the vanes is unimpeded. The outer end of each vane and the outer case share a common thermal environment; accordingly, each vane is securely joined to the outer case so that no relative displacement occurs between the vane and the case in any direction-longitudinally, circumferentially or radially.

In one known arrangement for anchoring each vane to the inner case, a longitudinally and circmnferentially extending shroud is attached to the inner end of each vane. The shroud contains an aperture in the general shape of the airfoil cross section of the vane. A sidewall at the perimeter of the aperture defines a compartment extending radially away from the flow path. The inner end of the vane fits into the compartment, spaced apart from the compartment sidewall. A vibration damping material, also referred to as a potting material, fills the void between the sidewall and the vane, thereby gripping the vane and securing the shroud thereto. One or more support pins extending radially outwardly from the inner case also penetrate into the damping material to complete the connection between the vane and the case. The pinned connection resists longitudinal and circumferential displacement of the vane relative to the case, but permits radial displacement therebetween to accommodate thermal effects. When the vanes and shrouds are assembled into the engine, each shroud abuts the circumferentially adjacent shrouds to form a continuous inner flow path boundary. The damping material, in addition to joining each vane to its shroud, also damps vane vibrations and resists circumferential and longitudinal displacement of the vane arising from the aerodynamic loads thereon.

While the above described arrangement is effective in older engines, it is inadequate for modern engines which operate at higher temperatures. Some of the thermal energy which causes expansion of the inner case is conducted through the support pins and into the damping material thereby elevating its temperature in the vicinity of the pins. At temperatures higher than a critical temperature, referred to as the transition temperature, the damping material near the pins becomes too soft to resist displacement of the vane relative to the case and pins.

This shortcoming might be overcome by substituting a damping material of higher transition temperature. However, materials with higher transition temperatures are also more resilient than those with lower transition temperatures. A more resilient material, distributed throughout the compartment, lowers the natural vibratory frequency of the vane. This is undesirable since the vane is exposed to vibratory excitations of various frequencies during normal engine operation. If the vane's natural frequency is lowered so much that it coincides with the frequency of one of the excitations, the vane will vibrate violently during engine operation, leading to the vane's damage or destruction.

The reduction of vane natural frequency could be mitigated with modifications to the vane geometry to make the vane stiffer or by constructing the vane of a different material, thereby compensating for the reduction of vane natural frequency associated with a damping material of high transition temperature. These approaches, however, are likely to increase the weight of the vane, a clear disadvantage in an aircraft turbine engine where weight minimization is a key design criterion.

The substitution of a higher transition temperature material may be undesirable even if the reduction of vane natural frequency is tolerable. During manufacture, the vane, shroud and damping material are subjected to a high temperature curing cycle to harden the damping material and bond it to the vane and shroud. Materials of high transition temperature are processed at higher curing temperatures than their low transition temperature counterparts. These elevated curing temperatures can distort the vane, which in modern engines is usually made of a nonmetallic material. Moreover, higher transition temperature materials tend to form weak bonds with the vane and the compartment wall, thereby compromising the structural integrity of the connection.

In view of these shortcomings, a vibration damping shroud that retains its damping capability in an elevated temperature operating environment without depressing the vane natural frequency, increasing engine weight, compromising structural integrity or risking vane distortion during manufacture is sought.

SUMMARY OF THE INVENTION

According to the present invention, a vibration damping shroud for a turbine engine employs two physically segregated vibration damping materials so that conflicting operational requirements are readily satisfied without the compromises that accompany the use of a single material. The shroud includes a radially extending chamber for receiving one end of a stator vane in a primary vibration damping material and at least one pin receiving cavity, independent of the chamber, containing a secondary vibration damping material. The secondary material slidably engages a corresponding support pin which extends from an adjacent case, thereby anchoring the vane to the case in a manner that accommodates relative radial displacement between the vane and the case.

The primary material is selected largely for its capability to damp vibrations without lowering the vane's natural vibratory frequency, thereby exposing the vane to potentially damaging vibratory excitation during engine operation. The secondary material is selected largely for its tolerance to elevated temperatures without yielding its ability to resist circumferential and longitudinal displacement of the vane.

In one embodiment of the invention, the secondary material is in the form of a sleeve secured to the inner surface of the cavity. The invention may also include a base plate made of a material dissimilar to that of the shroud. The base plate, which is secured to the shroud, has a hole associated with each of the cavities and corresponding support pins. Each support pin extends through the associated base plate hole and into the pin receiving cavity. Each base plate hole is dimensioned to prevent potentially damaging contact between the pin and the wall of the cavity in the event of the loss of the secondary material.

An advantage of the present invention is its ability to preserve the effectiveness of the primary damping material in an elevated temperature environment without increasing engine weight, lowering the vane natural frequency, compromising structural integrity or risking vane distortion during the curing cycle.

The foregoing advantage and the operation of the invention will become more apparent in light of the following description of the best mode for carrying out the invention and the accompanying drawings.

BRIEF DESCRIPTION OF THE DRAWINGS

FIG. 3 is a fragmentary, partially exploded perspective view of the prior art fan vane of FIG. 2, illustrating a conventional vibration damping shroud and vane support arrangement at the inner end of the vane.

FIG. 4 is a plan view taken along section line 4—4 of FIG. 3.

FIG. 7 is a plan view taken along section line 7—7 of FIG. 5.

BEST MODE FOR CARRYING OUT THE INVENTION

Figure 1:
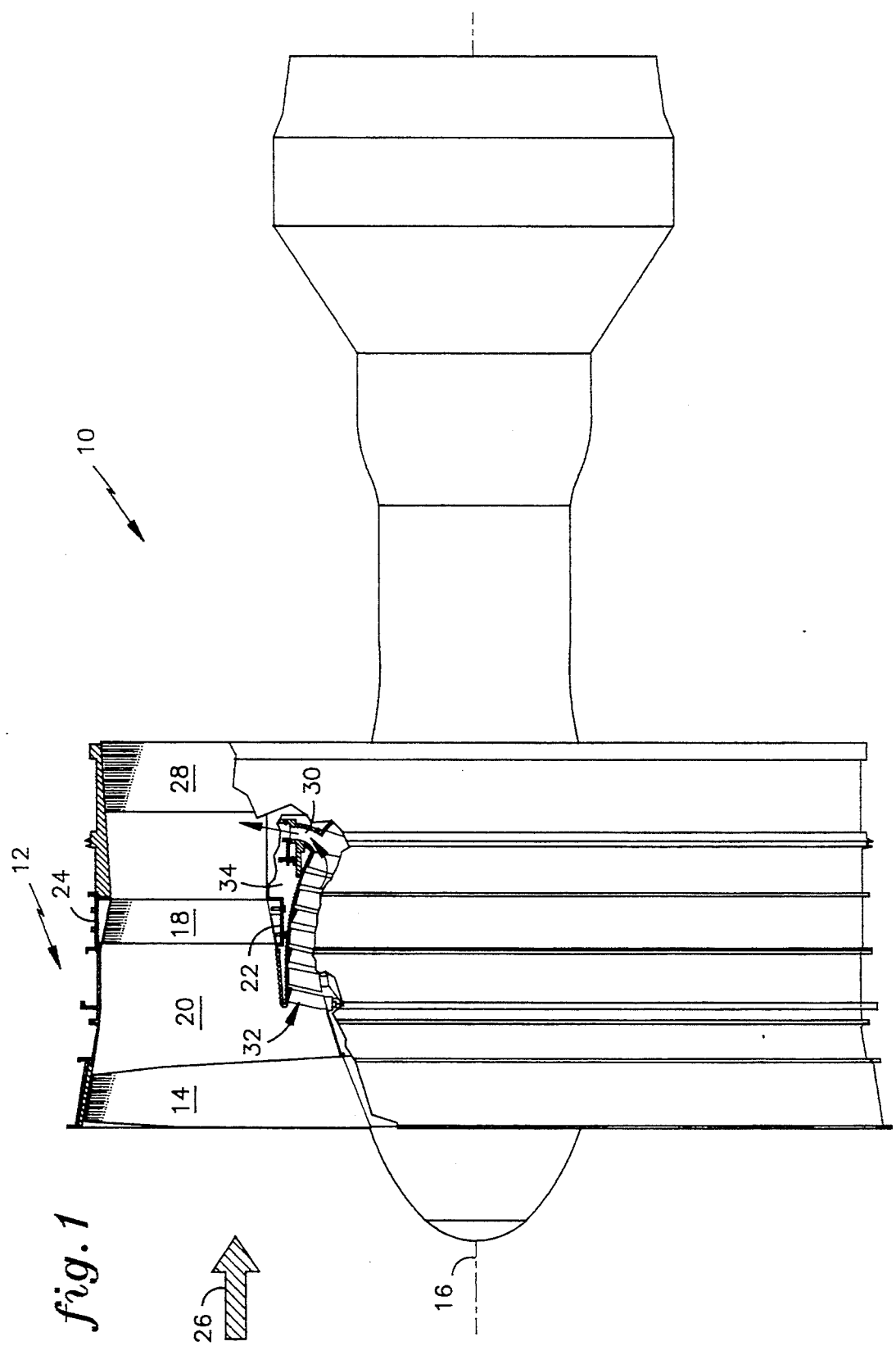
FIG. 1 is a schematic side elevation of a gas turbine engine with portions of the external casings thereof broken away to expose selected internal components including a fan vane having vibration damping shrouds at its inner and outer ends.

Referring to FIG. 1, a gas turbine engine 10 includes a fan section 12 having a row of blades 14 which rotate about a central longitudinal axis 16 and a row of nonrotating stator vanes 18. The blades and vanes extend radially across an annular flow path 20 and the vanes are joined to both inner and outer cases 22 and 24. Air 26, flows through the fan section where it is compressed and directed essentially longitudinally by the blades and vanes. Nonrotating structural support struts 28 connect the inner and outer cases.

Figure 2:
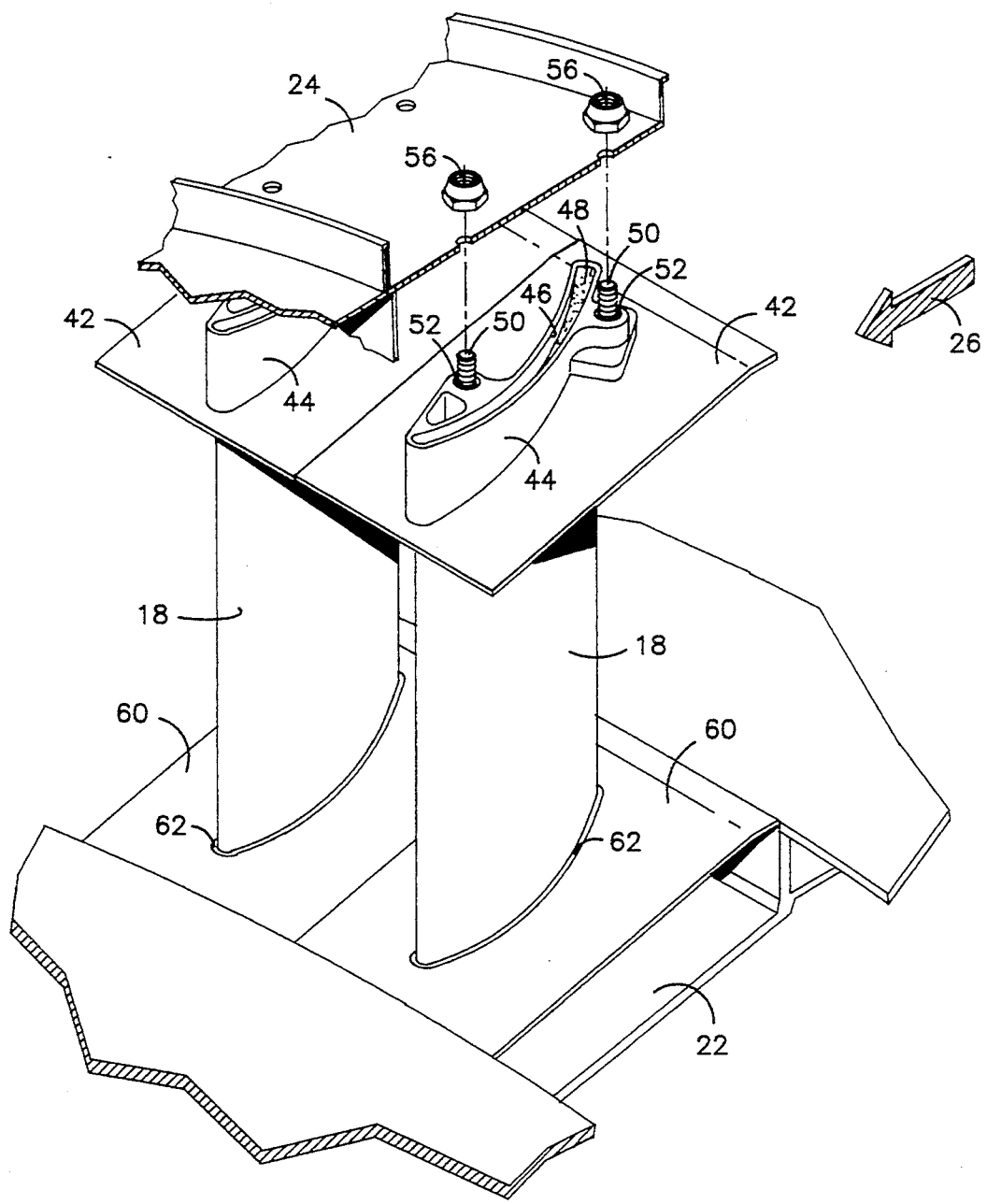
FIG. 2 is a fragmentary, partially exploded perspective view of a prior art fan vane as used in the engine of FIG. 1, illustrating a conventional vibration damping shroud and vane support arrangement at the outer end of the vane.

Because the vanes and the outer case share a common thermal environment, there is no thermally induced relative displacement between them during engine operation. Accordingly, each vane is securely joined to the outer case in a conventional manner that resists displacement of the vane relative to the case in all directions-longitudinally, circumferentially and radially. The end of the vane so secured is referred to generally as the fixed end. As seen best in FIGS. 2 and 3, the fixed end of each vane fits into an aperture 40 (FIG. 3) formed in outer shroud segment 42. A sidewall 44 FIG. 2 extends radially outwardly from the aperture to define an open ended compartment 46 for receiving the outer end of the vane 18. A vibration damping material 48, also known as a potting material, is disposed in the compartment to bond the shroud to the vane and, when the vanes are assembled in an engine, to damp vane vibrations and resist displacement of the vane. The shroud segment 42 includes a pair of threaded studs 50 which are secured within and protruded radially outward from socket 52 immediately adjacent the compartment 46. The studs project through the outer case 24 (shown slightly exploded in FIG. 2 for clarity) where nuts 56 are threaded onto the studs to connect the vane to the outer case. When assembled in the engine, each shroud cooperates with the circumferentially adjacent shrouds to define the outer flow path boundary.

By contrast, the inner case and the inner end of each vane may be exposed to different thermal conditions so that they expand and contract at different rates. For example, valve 30 (FIG. 1) may be provided to periodically bleed hot compressed air from an engine core compressor 32 and into an annular manifold 34, from where it is subsequently ducted overboard to preclude engine stall. The presence of hot air in the manifold expands the inner case in the radial direction since the case forms a portion of the manifold wall. Therefore, a pinned connection is used to anchor the vane inner end to the inner case in a manner that accommodates radial displacement between the vane and the case. The end of the vane secured in this fashion is generally referred to as the free end.

A prior art pinned connection for anchoring each vane to the inner case is illustrated in FIGS. 3 and 4. A longitudinally and circumferentially extending nonmetallic shroud 60 is attached to the inner end of each vane. The shroud contains an aperture 62 (FIG. 2) in the general shape of the airfoil cross section of the vane. A sidewall 64 at the perimeter of the aperture defines a compartment 66 extending radially away from the fan flow path. The vane 18 fits into the compartment, where a vibration damping material 68 fills the void between the sidewall and the vane, thereby gripping the vane and securing the shroud thereto.

A metallic base plate 70 is bonded to the shroud by an adhesive, (not shown). One or more metallic support pins 72 extending radially outwardly from the inner case 22 (shown slightly exploded in FIG. 3 for clarity) pass through holes 73 in the base plate and penetrate into the vibration damping material to complete the connection between the vane and the case. The support pin diameter is smaller than the hole diameter so that the low amplitude vane vibrations that occur during normal operation do not cause the perimeter of the hole to contact the pin. The hole diameter is small enough that if the secondary material is lost, for example by melting, the perimeter of the base plate hole is urged against the pin by the aerodynamic forces on the vane, limiting further displacement of the vane and preventing potentially damaging contact between the pin and the sidewall 64. The pinned connection resists longitudinal and circumferential displacement of the vane relative to the case but permits radial movement therebetween to accommodate thermal effects. When the vanes and shrouds are assembled into the engine, each shroud abuts the circumferentially adjacent shrouds to form an inner flow path boundary. The damping material joins each vane to its shroud, resists relative displacement therebetween and damps vibrations that occur during engine operation.

In modern engines, which operate at higher temperatures than their predecessors, the conventional pinned connection may be inadequate. The pins conduct heat into the damping material. If the temperature of the damping material is elevated beyond its transition temperature, the material in the vicinity of the pins becomes too soft to resist longitudinal and circumferential displacement of the vane. Although a material having a higher transition temperature can be substituted, such materials tend to be more resilient than those with lower transition temperatures. If such a resilient material is distributed throughout the compartment, the vane's natural vibratory frequency can be depressed so that it coincides with one of the excitory frequencies that normally occurs during engine operation. For example, aerodynamic wakes emanating from the rotating blades 14 (FIG. 1) strike each vane at a frequency determined by the blade rotational speed. If the vane's natural frequency is lowered so that it coincides with this excitory frequency, the vane will vibrate with a damaging or destructive intensity, a condition known as resonance. In summary, it has been determined that damping materials which do not lower the vane natural frequency are encumbered with unacceptably low transition temperatures, while those with sufficiently high transition temperatures are undesirable due to their effect on vane natural frequency. Moreover, materials with higher transition temperatures form poor bonds with the vane and compartment walls and must be cured at temperatures that carry a risk of distorting the vane.

Figure 6:
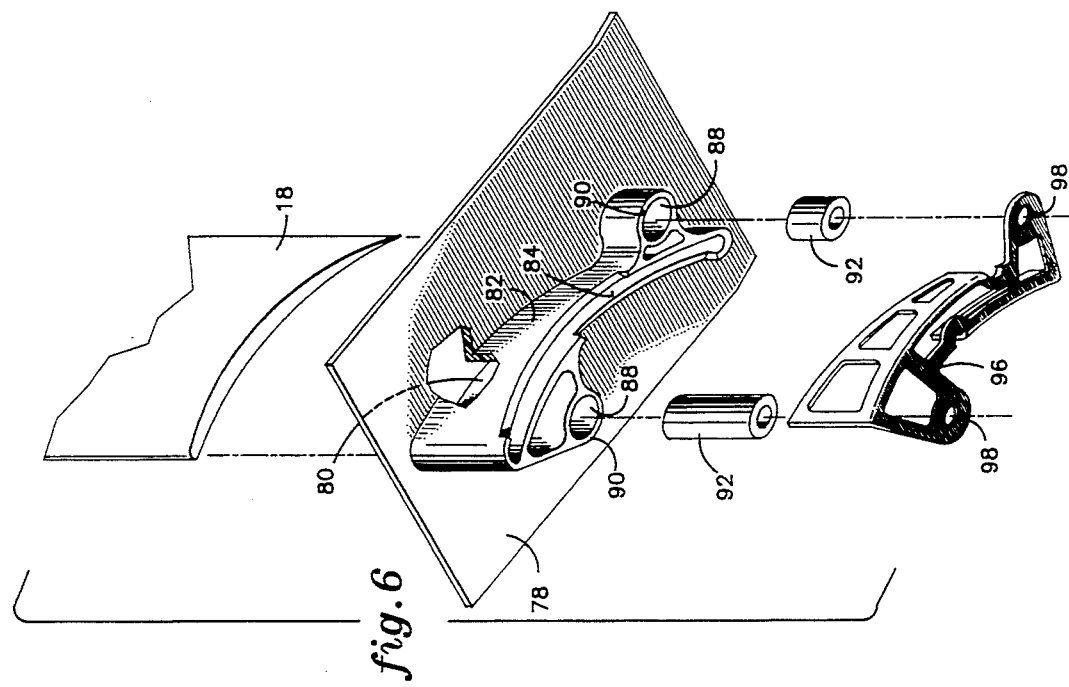
FIG. 6 is a fragmentary, exploded perspective view of the vibration damping shroud of FIG. 5.
Figure 5:
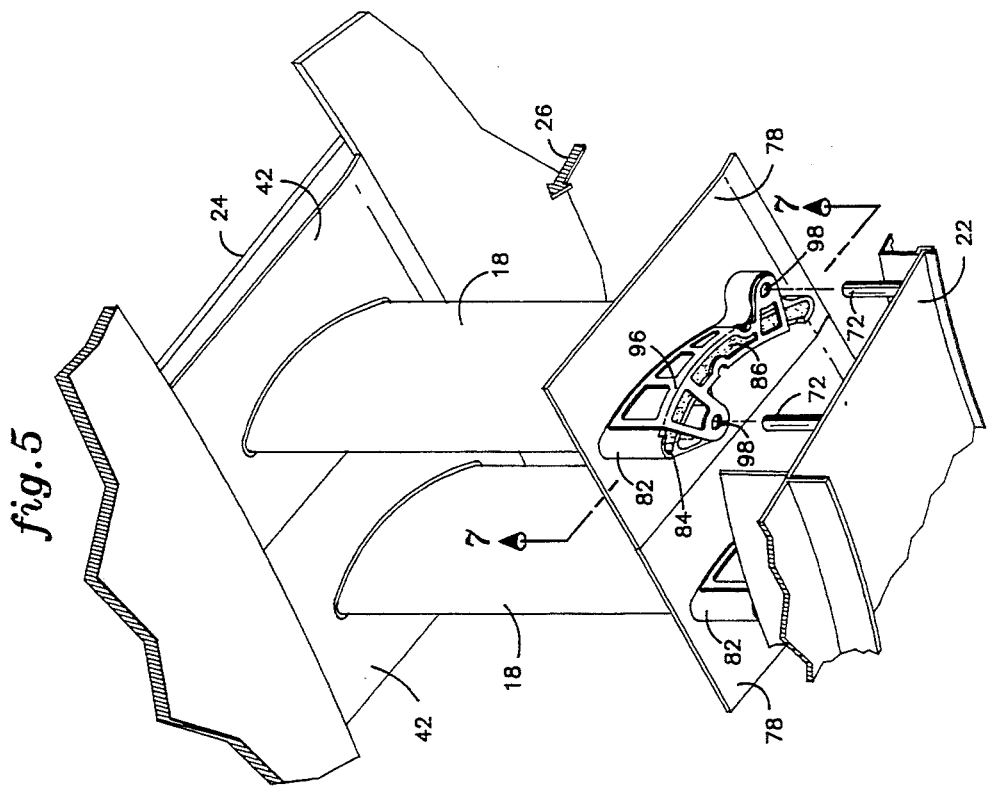
FIG. 5 is a fragmentary, partially exploded perspective view of a fan vane employed in the engine of FIG. 1, illustrating the vibration damping shroud of the present invention.

The prior art shroud cannot reconcile the conflicting requirements of maintaining the vane natural frequency higher than the frequency of excitations while using a material of sufficiently high transition temperature to resist vane displacement at elevated temperatures. These conflicting requirements are, however, successfully satisfied by the unique vibration damping shroud of the present invention as illustrated in FIGS. 5, 6, and 7. A nonmetallic shroud 78 which extends longitudinally and circumferentially to form a portion of the inner flow path boundary has an aperture 80. A sidewall 82 extends radially from the aperture to define a chamber 84 for receiving the inner end of each vane 18. A primary damping material 86 fills the void between the chamber sidewall and the vane to secure the shroud to the vane, resist displacement of the vane arising from aerodynamic loads thereon, and damp vane vibrations that occur during engine operation.

The shroud also has at least one radially extending cavity 88 defined by a cavity wall 90. Each cavity is independent of the chamber and contains a secondary vibration damping material which, in the preferred embodiment, is in the form of a sleeve 92. The secondary material slidably engages the corresponding support pin 72 which extends from the inner case 22 to anchor the vane to the case in a manner that is longitudinally and circumferentially secure but radially unrestrained.

Since the chamber and the cavity are independent, the primary and secondary vibration damping materials are chosen for their ability to satisfy the aforementioned conflicting requirements. Owing to the segregation of the chamber and the cavities, heat from the support pins is not readily transferred into the primary material, and the primary material is thus selected largely for its ability to adequately damp vane vibrations while maintaining the vane natural frequency higher than the excitory frequencies to which the vane is exposed during engine operation. It is unnecessary to compromise this ability by selecting a material of high transition temperature. Conversely, the secondary material is chosen largely for its ability to tolerate elevated temperatures without becoming so soft that it is incapable of resisting relative displacement between the shroud and the pins. Accordingly, the secondary material has a higher transition temperature than the primary material. Of course, the applicability of the shroud can also be extended to environments that do not demand materials with different transition temperatures. In these circumstances, materials of equal transition temperature, or even the same material, are used in the cavities as well as the chamber.

The relative proportions of the primary and secondary materials, and therefore the volumes of the chamber and the cavities, are selected so that the primary material has a greater influence than the secondary material on the dynamic behavior of the vane. If the quantity of primary material significantly exceeds that of the secondary material, the vibrational damping characteristics and natural frequency of the vane will be similar to that associated with the primary material alone. Therefore, the chamber volume is larger than the combined volume of the cavities so that the natural frequency of vane vibration is not depressed into the range of the excitory vibratory frequencies encountered during engine operation.

In the preferred embodiment, the primary material is polyurethane and the secondary material is silicone rubber in the form of a sleeve secured to the inner surface of its cavity.

The shroud of the present invention is entirely compatible with a damage limiting base plate like that of the prior art. Therefore, the invention may also be used with a base plate 96 made of a metal or other material dissimilar to the shroud material and secured thereto. The base plate has a hole 98 associated with each pin receiving cavity 88 and corresponding pin 72, with the hole diameter smaller than that of the cavity. Each support pin extends through the associated base plate hole to reach into the corresponding receiving cavity.

In operation, the primary damping material absorbs the vibratory energy of the vane thereby damping the vibrations, secures the vane to the shroud, and transmits the aerodynamic forces acting on the vane into the shroud. The secondary material transmits those forces from the shroud to the support pins so that circumferential and longitudinal displacement of the vane is resisted. Thermally induced growth or contraction of the case relative to the vanes causes each support pin to slide radially along the surrounding sleeve of secondary material. The secondary material, being limited in quantity relative to the primary material, plays an inappreciable role in damping vane vibrations.

In certain circumstances, for example, if a fan blade 14 (FIG. 1) sustains significant damage, vane vibrations of abnormally high amplitude can occur. The resulting friction between the secondary material 92 and each support pin 72 raises the temperature of the secondary material to its melting point. Consequently, the aerodynamic loading on each vane causes the perimeter of the base plate holes 98 to contact the pins. Since the metallic base plate has a higher melting temperature than either the secondary material or the shroud, the base plate does not melt and prevents further displacement of the free end despite the loss of the secondary material. The base plate holes are dimensioned so that contact between the pins and the cavity walls 90 is precluded. For example, in the engine where the initial use of the invention is anticipated, the vane vibrations are substantially confined to a plane perpendicular to the longitudinal central axis. Therefore, the width of the base plate hole, that is its dimension parallel to the plane of vibration, is smaller than the corresponding width of the cavity. If this were not so, or if the base plate were absent, displacement of the free end following loss of the secondary material would not be limited, and could bring the pin into contact with the cavity wall. Since the metallic pin had been heated to a high temperature due to frictional resistance of the secondary material, such contact can melt the nonmetallic cavity wall resulting in a complete loss of support at the inner end of the vane.

The shroud, vane, secondary material sleeve and base plate are manufactured separately and assembled prior to being installed in an engine. A sleeve of the secondary material is placed in each cavity along with a suitable adhesive, such as an epoxy paste, for bonding the sleeve to the cavity wall. The base plate is positioned against the sidewall with a suitable adhesive therebetween, for example the same polyurethane that is used as the first vibration damping material. A first assembly fixture (not shown) positions the vane in the chamber so that the vane surface is spaced apart from the chamber sidewall. The fixture also seats against the radially inward extremity of the sidewalls to hold the base plate in place and to seal off the inner end of the chamber. A second fixture (not shown) seats against the radially outer or flow path side of the shroud to complete the sealing off of the vane receiving chamber. A quantity of the primary material is injected into the chamber through injection ports in the first fixture. The assembly is then heated to cure the adhesives and damping materials, after which the fixtures are removed and the vane is installed in an engine.

While the invention has been described in the context of a fan stator vane whose fixed and free ends are the outer and inner ends respectively, it is equally applicable to any vane having either end free and the other end fixed.

The shroud has also been illustrated as having a single chamber for receiving a single vane and a pair of cavities for receiving corresponding support pins. However, any suitable number of support pins and cavities can be used, and multiple chambers for receiving multiple vanes can be provided without departing from the spirit and scope of the appended claims.

I claim:

1. In a turbomachine having a row of stator vanes extending radially across an annular flow path formed between an inner case and an outer case, each vane having a fixed end securely joined to one of said inner and outer cases, each vane also having a free end capable of relative radial displacement with respect to the other of said inner and outer cases and anchored thereto by a vibration damping shroud, said shroud having a chamber for receiving said free end and also having a primary vibration damping material disposed in said chamber for securing said free end to said shroud and for damping vibrations of said vane, said other case also having at least one radially extending support pin corresponding to each of said vanes, said shroud characterized by:

a cavity independent of said chamber for receiving each corresponding support pin; and a secondary vibration damping material disposed in said cavity and slidably engaging said pin for anchoring said shroud to said other case while accommodating relative radial displacement therebetween.

2. The vibration damping shroud of claim 1 characterized by the resilience of said primary vibration damping material being such that the natural vibrational frequency of said vane is higher than the excitory vibrational frequencies to which said vane is exposed during engine operation, and the transition temperature of said secondary vibration damping material being at least as high as that of said primary material.

3. The vibration damping shroud of claim 2 characterized by the volume of said chamber being greater than the combined volume of said cavities so that the natural frequency of vane vibration is higher than the excitory vibratory frequencies encountered during normal engine operation.

4. The vibration damping shroud of claim 1 characterized by a base plate of material having a higher melting temperature than that of said shroud and secured to said shroud, said base plate having a hole associated with each of said cavities and corresponding support pins for enabling said pins to extend through said base plate and into said cavity, each hole being dimensioned to preclude contact between said pin and said cavity wall in the event of the loss of the secondary vibration damping material.

5. The vibration damping shroud of claim 1 characterized by said primary vibration damping material comprising polyurethane and said secondary vibration damping material comprising silicon rubber.

6. The vibration damping shroud of claim 1 characterized by said cavity being defined by a cavity wall and said secondary material comprising a sleeve secured to the inner surface of said cavity wall.

* * * * *